US007595004B2

(12) United States Patent
Giovanola et al.

(10) Patent No.: US 7,595,004 B2
(45) Date of Patent: Sep. 29, 2009

(54) INK JET PRINTHEAD AND RELATIVE MANUFACTURING PROCESS

(75) Inventors: Lucia Giovanola, Ivrea (IT); Renato Conta, Ivrea (IT)

(73) Assignee: Telecom Italia S.p.A., Milan (IT)

( * ) Notice: Subject to any disclaimer, the term of this patent is extended or adjusted under 35 U.S.C. 154(b) by 681 days.

(21) Appl. No.: 10/538,743

(22) PCT Filed: Dec. 16, 2003

(86) PCT No.: PCT/IT03/00824

§ 371 (c)(1),
(2), (4) Date: Jun. 14, 2005

(87) PCT Pub. No.: WO2004/056574

PCT Pub. Date: Jul. 8, 2004

(65) Prior Publication Data

US 2006/0055737 A1 Mar. 16, 2006

(30) Foreign Application Priority Data

Dec. 19, 2002 (IT) .......................... TO2002A1100

(51) Int. Cl.
*G01D 15/00* (2006.01)

(52) U.S. Cl. ................................ 216/27; 216/95; 347/7

(58) Field of Classification Search .................. 216/27, 216/95, 108; 347/42, 47, 50, 1, 7
See application file for complete search history.

(56) References Cited

U.S. PATENT DOCUMENTS

| | | | | |
|---|---|---|---|---|
| 4,719,477 | A | 1/1988 | Hess | |
| 5,733,433 | A * | 3/1998 | Lee et al. | 205/665 |
| 6,315,393 | B1 * | 11/2001 | Van Nice et al. | 347/45 |
| 6,482,574 | B1 | 11/2002 | Pugliese, Jr. et al. | |
| 6,592,205 | B2 * | 7/2003 | Beerling et al. | 347/42 |

FOREIGN PATENT DOCUMENTS

| | | | |
|---|---|---|---|
| EP | 0 783 970 | A | 7/1997 |
| EP | 0783 970 | A2 | 7/1997 |
| WO | WO 01/03934 | A | 1/2001 |
| WO | WO 01/03934 | A1 | 1/2001 |

* cited by examiner

*Primary Examiner*—Lan Vinh
(74) *Attorney, Agent, or Firm*—Venable LLP; Robert Kinberg; Steven J. Schwarz

(57) ABSTRACT

The chambers (42) and each corresponding ink feeding duct (56), made in a structural layer of photosensitive resin (38), are delimited by a flat bottom wall (36) made of a protective layer (34, 36) of tantalum and gold and an upper wall (44), consisting of a substantially concave surface, including at least one ejection nozzle (46) and joined to the bottom wall along a continuous perimetral line (52), in which the inner shape of each of the chambers (42) and of each of the feeding ducts (56) represents the complementary impression of the outer form of a sacrificial layer (57), obtained from a controlled and non-contained growth of a metal, deposited starting from the dimensions of the layer of gold (36), laid on top of the layer of tantalum (34).

16 Claims, 12 Drawing Sheets

INK JET PRINTHEAD AND RELATIVE MANUFACTURING PROCESS

This application is a National Phase application of co-pending PCT/IT2003/000824, filed 16Dec. 2003, which was published in English under PCT Article 21(2) on 8Jul. 2004, which claims the benefit of Italian Application TO 2002 A 001100, filed 19Dec. 2002. These applications are incorporated herein in there entireties.

TECHNOLOGICAL AREA OF THE INVENTION

This invention relates to a printhead used for forming characters and/or images with black or colour ink, on a print medium, generally—but not exclusively—a sheet of paper, through the known, bubble type ink jet technology, and in particular relates to an improvement of the ejection chambers, relative feeding ducts and relative manufacturing process.

BRIEF DESCRIPTION OF THE STATE OF THE ART

The constitution and mode of operation of an ink jet printhead based on the thermal technology, and more in particular the type called "top shooter", in which the droplets are ejected in a direction perpendicular to the surface of the actuating element, or resistor, are generally well-known in the current art.

Accordingly here we shall restrict ourselves to describing some only of the characteristics of a conventional head of this type, known in the current state of the art, and the most important steps of its manufacturing process, for the purposes of a better understanding of this invention.

Shown in FIG. 1 in synthetic form is a conventional ink jet printer 1, in which the most relevant parts for the understanding of this invention are highlighted: the printer 1 comprises a fixed structure 2, on which a carriage 4 may move on guides 6 in a scanning direction "x"; mounted on the carriage 4 are four ink jet printheads 8, one for printing in black and three for colour printing, for printing on a print medium 9, typically a sheet of paper, wound partially on a print roller 10; the scanning stroke of the carriage 4 is controlled by an encoder 12.

The same figure also shows the axes of reference: x axis, horizontal, parallel to the scanning direction of the carriage 4; y axis, vertical, parallel to the direction of the line feed of the medium 9; z axis, perpendicular to the x and y axes.

FIG. 2 represents an expanded perspective view of an actuating assembly 15 of one of the four ink jet printheads 8 mounted on the printer 1 of FIG. 1, with particular reference to the known printhead described in the International Patent Application published under number WO 01/03934; the actuating assembly 15 comprises a structure 16 having two rows of nozzles 18 parallel to the y axis, and a die 20, which comprises an array of driving microcircuits 22, made by means of the known C-MOS/LD-MOS technology, and soldering pads 23, which permit electrical connection to be made between the microcircuits 22 and the control circuits of the printer 1, not depicted.

The actuating assembly 15 also comprises an array 25 of ink feeding ducts and channels, chambers and actuating elements, or resistors, made in the form of thin portions of metallic layers inside the chambers.

The manufacturing process of the actuator 15 is conducted on a wafer 27 (FIG. 3) made of a plurality of die 20, on each of which the driving microcircuits 22 are produced and completed in a first part of said process, and, in a second part of said process, the array 25 of feeding ducts and channels, of chambers and resistors is made; the single die 20 are separated using a grinding wheel at the end of the manufacturing process.

The chambers for ejection of the droplets of ink and the relative feeding ducts connected to these, produced according to the known techniques and in particular described in the already cited International Patent Application, are made by way of the chemical removal of sacrificial layer of electrolytic copper, electrodeposited in a seat of substantially parallelepiped shape, namely with walls substantially flat and perpendicular to one another, produced on the inside of a polymeric structural layer, deposited on top of a layer of gold and tantalum disposed above the resistors.

Consequently the internal shape of the ejection chambers and relative ink ducts, communicating directly with the chambers, present numerous live edges and surface discontinuities, which faithfully reproduce the shape of the sacrificial layer.

Therefore the shape of the chambers and the ducts connected to them promotes, while the printhead is operating, the growth of air bubbles which become attached to the above-mentioned discontinuities, causing serious difficulties in the process of formation of the ejection bubble and obstructing the flow of ink to the feeding ducts.

SUMMARY DESCRIPTION OF THE INVENTION

The object of this invention is to produce an integrated ink jet printhead suitable for reducing the drawbacks outlined above.

Another object of the invention is to produce the chambers and feeding ducts connected to them with internal surfaces shaped in such a way as to avoid air bubbles becoming attached.

A further object of the invention is to produce the chambers and feeding ducts connected to them with inner surfaces shaped in such a way as to promote the expulsion of any air bubbles and the development of the ejection bubble.

In accordance with this invention, an optimized printhead and the relative manufacturing process are presented, characterized in the way defined in the respective main claims.

These and other characteristics of the invention will appear more clearly from the following description of a preferred embodiment of an ink jet printhead and relative manufacturing process, provided as a non-restrictive example, with reference to the figures of the accompanying drawings.

DESCRIPTION OF A PREFERRED EMBODIMENT

The optimized ink jet printhead, according to this invention, features an improvement in the production of the ejection chambers and the relative ink feeding ducts, so that this improvement concerns only the final part of the head actuating assembly manufacturing process. Accordingly only the stages necessary for a clear and complete understanding of the manufacture of the ejection chambers and relative ink feeding ducts, according to this invention, will be described in detail.

It is assumed therefore that the said improvement may be applied to different kinds of "top shooter" type ink jet printheads, known in the sector art, in which the droplets are ejected in a direction perpendicular to the surface of the actuating element, or resistor, and in particular, as a non-restrictive example, to the monolithic printhead described in the already cited International Patent Application no. WO 01/03934, and to which reference should be made for more complete information about the initial stages of manufacture.

Figure 5:
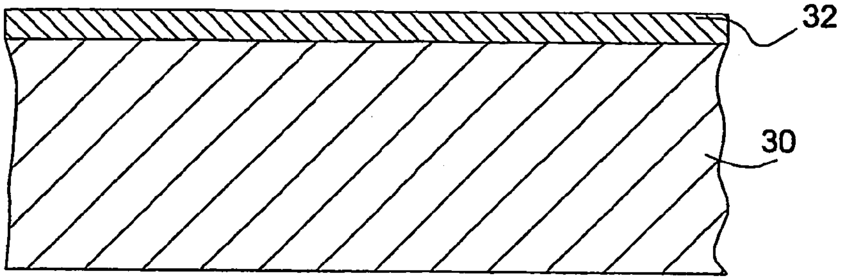
FIG. 5 represents in section a die at the end of a first manufacturing phase, and ready for execution of the manufacturing process according to this invention.

FIG. 5 shows a section of a die 20 (FIG. 3), relative to a conventional printhead, at the end of a first manufacturing phase, in which, with any one of the construction processes known in the art, a plurality of metallic and dielectric layers has been deposited on a layer 30 of crystalline silicon in order to produce an array of microcircuits suitable for driving thermal actuating elements, or resistors, not shown as they are not in the plane of section; in turn, the resistors are covered by a dual layer 32 of silicon carbide and nitride ($Si_3N_4$, SiC).

Figures 6, 6A:
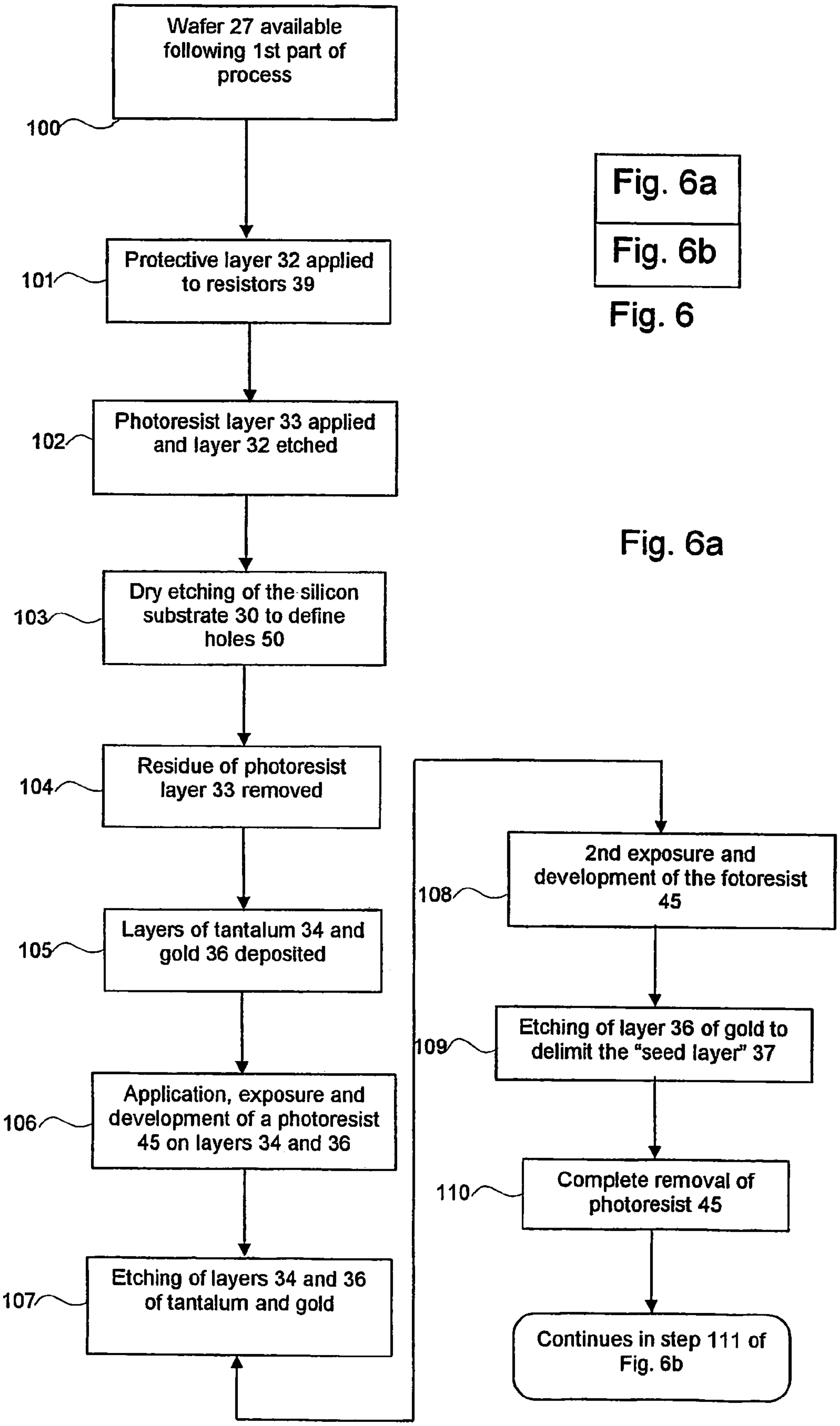
FIG. 6 represents a flow diagram of the printhead manufacturing operations according to this invention.

The process of completing manufacture of the optimized printhead, according to this invention, continues starting from the current situation, described earlier, according to the steps indicated in the flow diagram of FIG. 6 and consists in manufacturing the ejection chambers, the relative ink feeding ducts connected to them, and the ejection nozzles.

Figure 4:
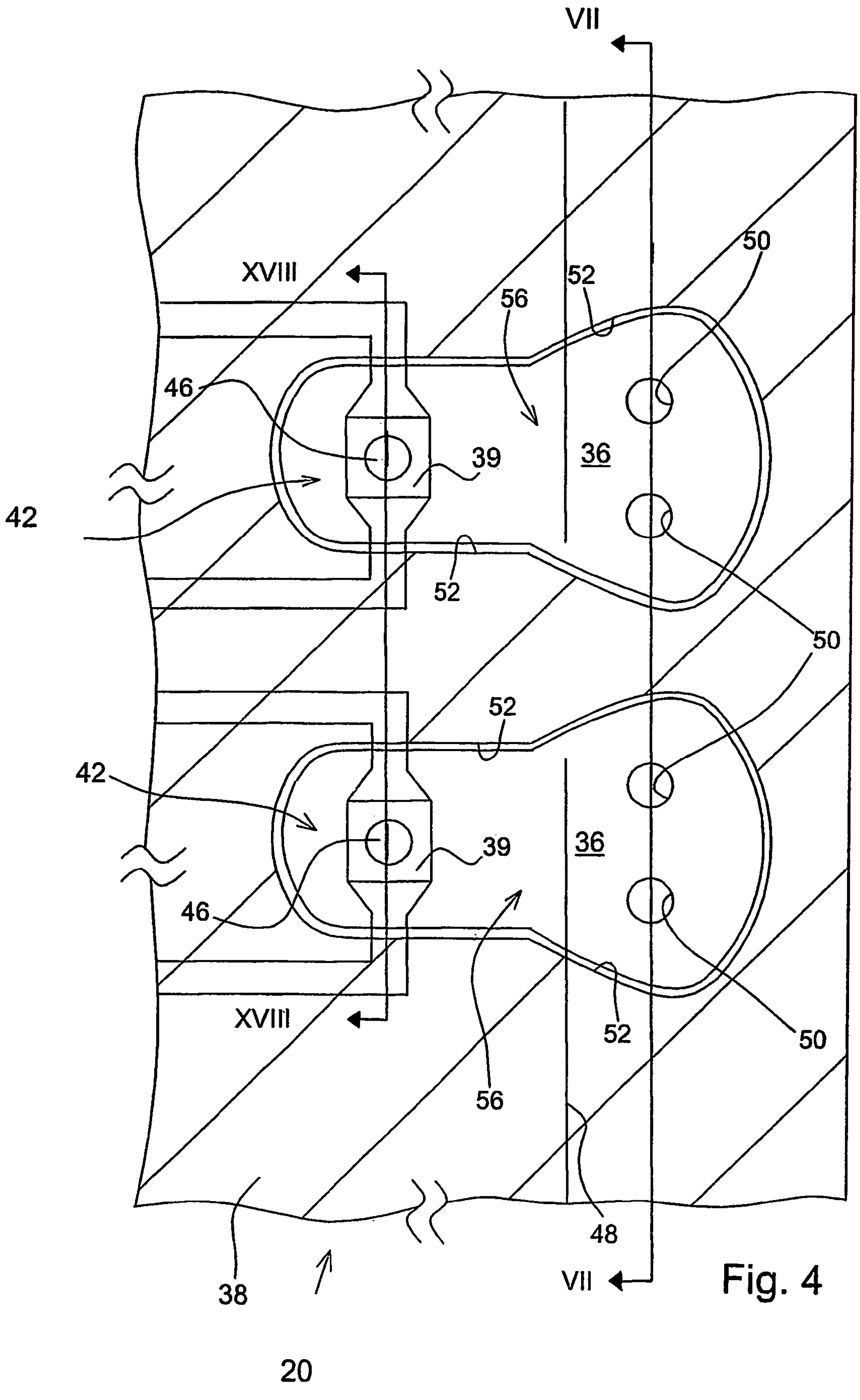
FIG. 4 represents a plan sectional view of a zone of a die of FIG. 3, taken parallel to the bottom wall of the ejection chambers.
Figure 7:
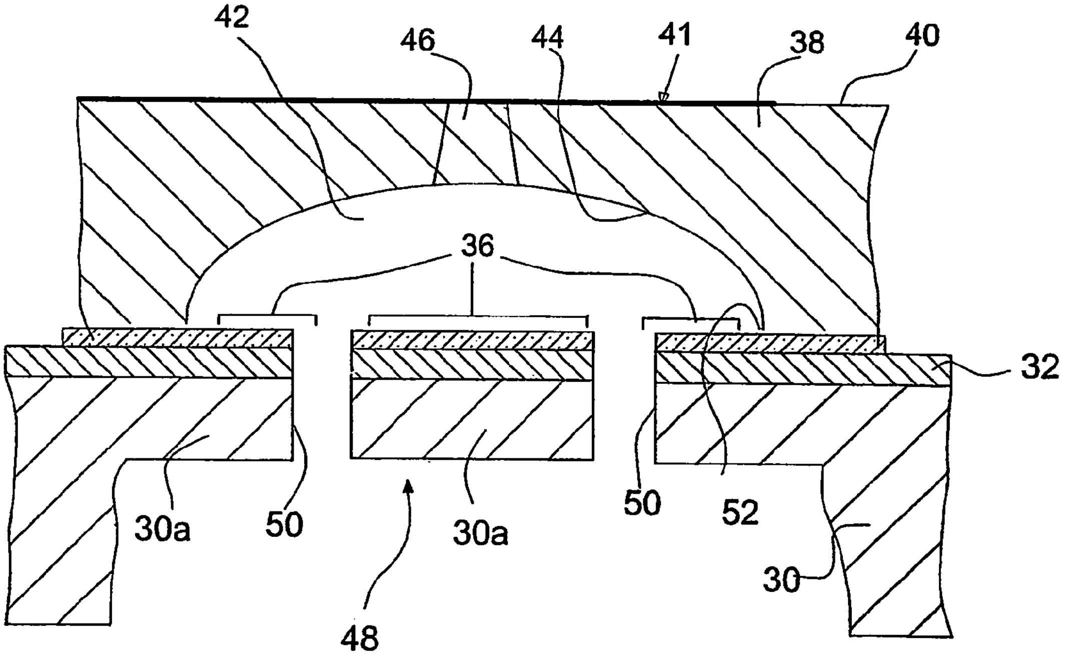
FIG. 7 represents a section along the line VII-VII of FIG. 4 of an optimized ink jet printhead, according to this invention, as it appears at the end of the manufacturing process.

FIG. 7 represents a section according to a line VII-VII of FIG. 4, of an optimized ink jet printhead, according to this invention, as it appears at the end of the manufacturing process; in it the following may be seen:

- a sublayer of silicon 30, in which a storage chamber 48 has been made for the ink in the bottom part,
- a dielectric layer 32, for protection of the resistors (not shown in the figure), made respectively of silicon nitride ($Si_3N_4$) and silicon carbide (SiC);
- a layer of tantalum 34;
- a layer of gold 36 on top of a part of the layer of tantalum and constituting what is called the "seed layer", i.e. the layer from which galvanic growth of the sacrificial layer starts, as will be described in the following;
- a structural, polymeric layer 38, of a type known in the art;
- a protective layer 41, with anti-wetting function deposited on the outer surface 40 of the structural layer 38;
- an ejection chamber 42, delimited by an upper concave wall 44 and made in the thickness of the structural layer 38;
- a nozzle 46 for ejection of the ink droplets, communicating with the chamber 42, traversing the structural layer 38;
- an ink feeding slot 48, made in the silicon layer 30, on the side opposite the nozzle 46, and communicating with the chamber 42 through two holes 50, which pass through the layers 32, 34, 36.

The layers of tantalum 34 and of gold 36 constitute the bottom wall 43 of the chamber 42; the layer of tantalum is more extensive and extends partially under the structural layer 38 beyond the contour line 52 of chamber 42, whereas the layer 36 of gold is less extensive and is completely contained inside the chamber 42.

Figure 16:
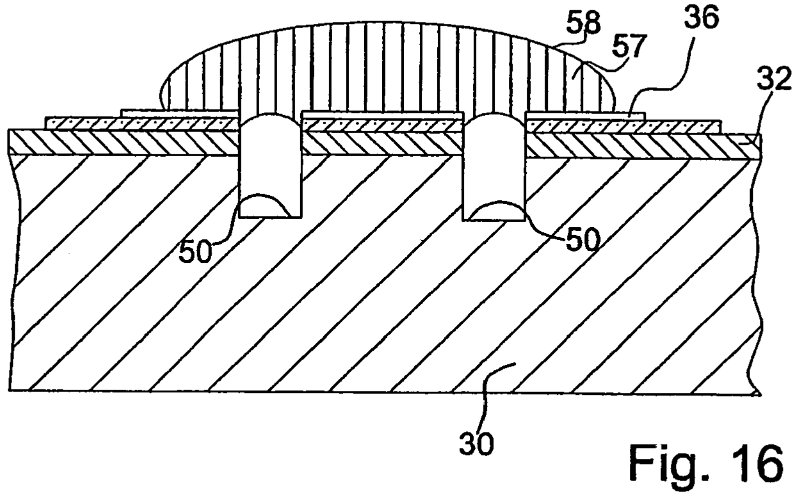

The inventors have found that, by performing a liberal electrodeposition, i.e. in controlled, non-contained mode, of a sacrificial layer 57 (FIG. 16) of copper, having suitably selected the chemical composition of the galvanic bath, in order to establish a given growth ratio, it is possible to modify the percentage of liberal growth of the sacrificial layer on the horizontal (x axis) with respect to that on the vertical (z axis), starting from a given dimension of the seed layer Thanks to this technique, the upper external surface 58 of the sacrificial layer is grown with a convex shape, typically dome shape, the convexity of which may be varyingly pronounced, in relation to the horizontal extension of the growth of the copper.

As outlined above, the sacrificial layer 57 of copper, is deposited with a substantially liberal growth, without any restriction on the contour, that is to say in controlled, non-contained mode:

- in controlled mode, since the electrodeposition of the copper is realized using an electrolytic bath, the composition and relative additives of which, known in themselves to those acquainted with the sector art, allow the growth ratio of the sacrificial layer 57 to be controlled in the horizontal direction (x axis), with respect to the vertical direction (y axis);
- in non-contained mode, in that the growth, unlike previous manufacturing practice described in the state of the known art, is not limited by the inner shape of a seat, closed off by lateral walls, produced in a layer of photopolymer.

By employing this technique, when the sacrificial layer 57 is covered with a structural layer 38 of a suitable resin and after the sacrificial metal 57 is removed, chambers 42 and relative feeding ducts 56 (FIG. 4), bounded by concave upper walls 44, i.e. having the shape of a varyingly pronounced dome, and which represent the complementary and true impression of the form of the sacrificial layer 57, are obtained easily inside the sacrificial layer. Also, with a simple variant of the process, by continuing the electrodeposition of the sacrificial layer, "pillars" 74 (FIG. 22) of a complementary, preestablished shape to the nozzles 46 may be produced, so that ejection nozzles 46, modelled faithfully on the pillars 74, can be made directly in the structural layer.

With this technique ejection nozzles 46 perfectly aligned with the chambers 42 and with the corresponding resistors 39 are obtained, completely eliminating the positioning errors that occur when the known techniques are used to produce the nozzles.

Figure 1:
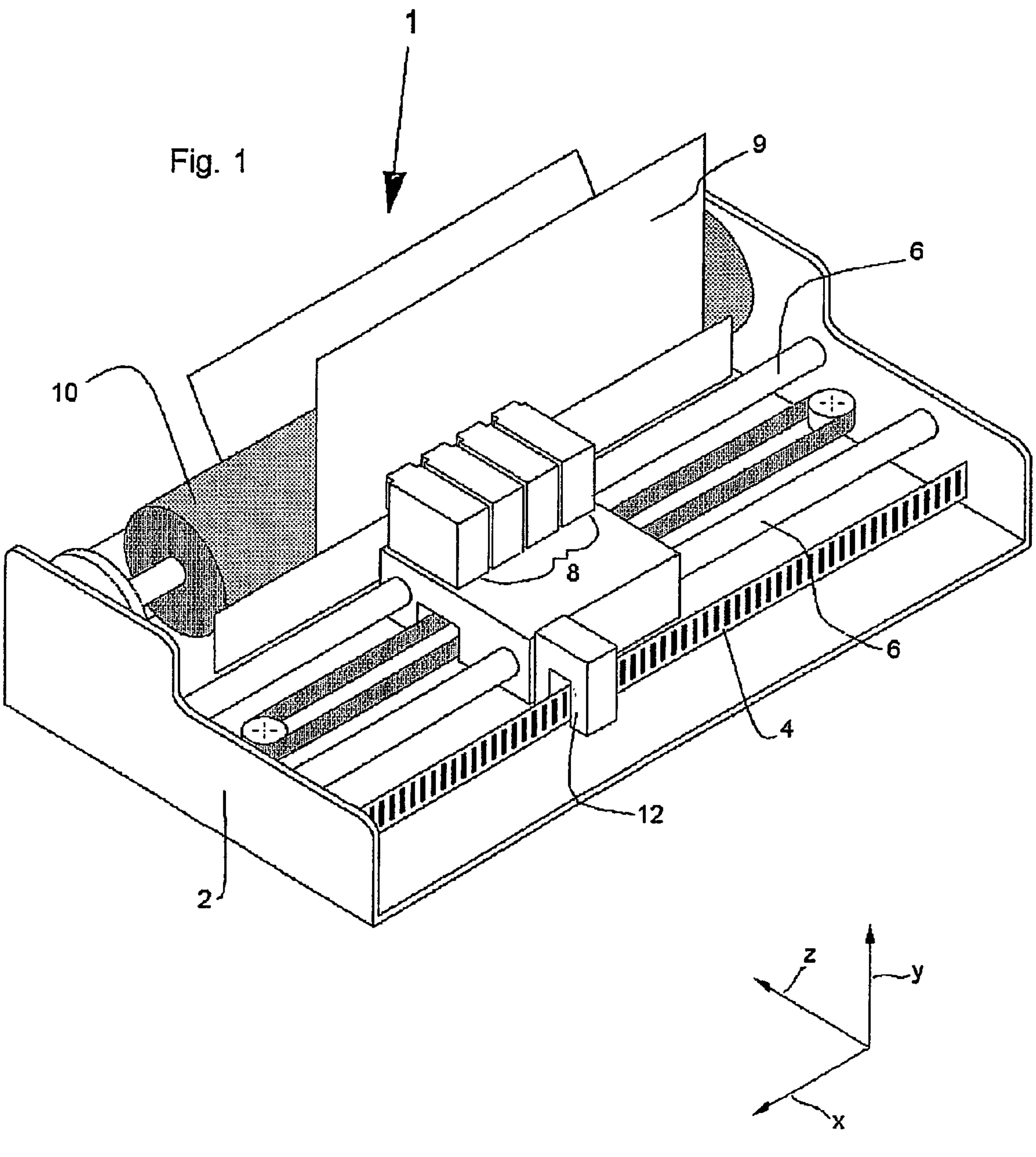
FIG. 1 represents an axonometric view of a conventional ink jet printer.
Figure 2:
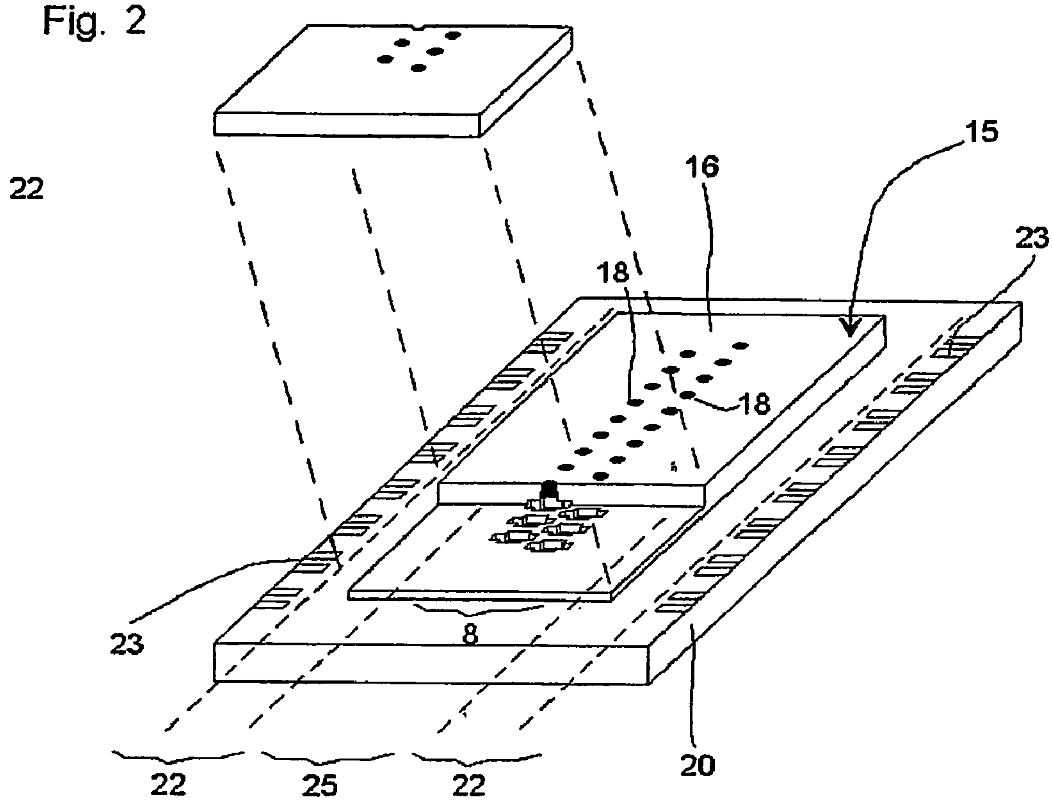
FIG. 2 represents an expanded view of an actuating assembly produced according to the known art.
Figure 3:
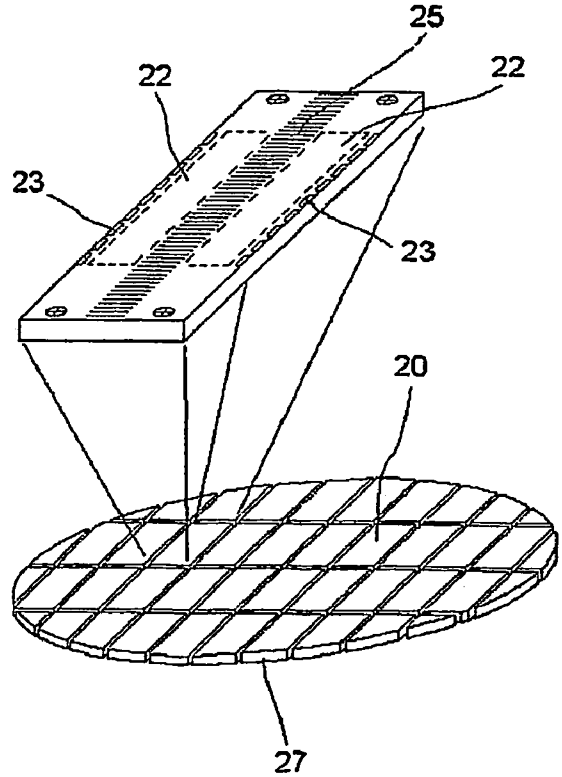
FIG. 3 represents a wafer of semiconductor material on which die not yet separated are indicated.

The chemical etching and activation of an area of the layer of gold 36, having a predetermined size, allows the start of a uniform deposition of the copper over the whole surface of the gold and beyond, on the layer of tantalum, starting from the extension of the said area. This operation is conducted simultaneously on all the die 20 belonging to the wafer 27 (FIG. 3).

The copper in fact begins its own deposition only in the area of the surface of the seed layer of gold 36, previously delimited and activated, and it later extends beyond the layer of gold, on to the layer of tantalum 34, until it assumes a dimension on the horizontal that is proportional to the desired thickness of the sacrificial layer 57, in accordance with the growth ratio set upon selection of the composition of the electrolytic bath and relative additives.

In practice, without departing from the scope of this invention, in order to obtain the chambers and relative, associated ducts of preestablished dimensions (on the horizontal), dictated by the requirements of correct functioning of the head, the "seed layer" surface area, from which the deposition of the sacrificial layer starts, is delimited by way of a preliminary etching operation on the layer of activated gold. Growth of the copper will be interrupted after a predetermined interval of time, on expiry of which the thickness of the sacrificial layer of copper will have reached a preestablished value. Corresponding to this value will be a well-defined horizontal extension of the sacrificial layer, determined by the growth ratio, set initially upon selection of the composition of the galvanic bath and its additives.

Accordingly the seed layer of gold is localized only in the zones on which the sacrificial layer is to start to grow, i.e. in the zones in which the chambers and relative ducts are to be built, without having to cover with gold all of the surface occupied by the layer of tantalum, as required in the prior art. This expedient involves an extra exposure-development phase and an additional etching of the layer of gold, but in turn offers the advantage of a consistent amount of gold being saved. It also means that, when the seed layer of gold is etched, the problems connected with a sub-etching (underneath the structural layer), which could trigger a start of detachment of the layer itself, or encapsulate impurities, are avoided.

Furthermore, to avoid the presence of discontinuities in the chambers and connected ducts, it is desirable for the layer 34 of tantalum to extend to a certain extent, externally with respect to the final dimension of the bottom wall of the chambers and of the relative ducts.

A detailed description now follows of the operations to produce the chambers, the feeding ducts and the ejection nozzles, with reference to the flow diagram in FIG. 6.

1st Embodiment: Photosensitive Structural Layer

Figure 8:
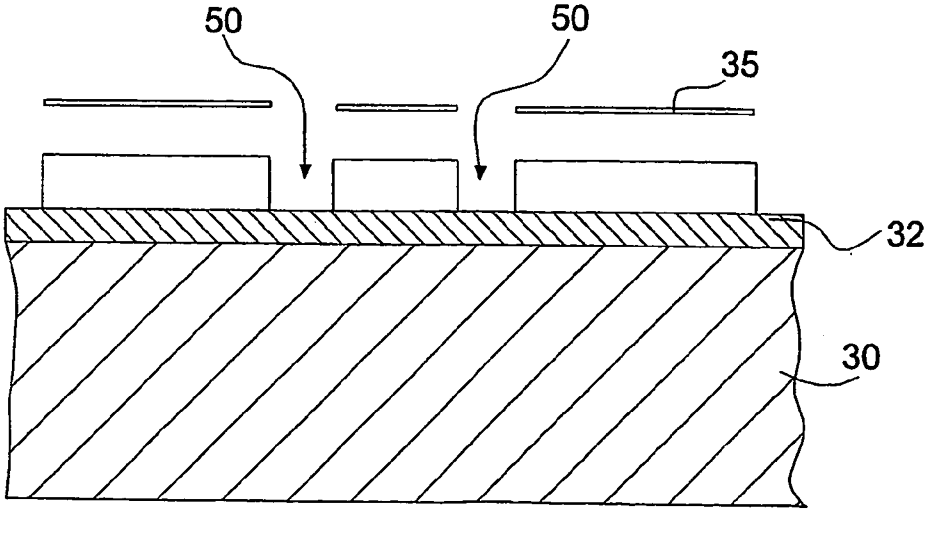
FIGS. 8 to 23 represent the subsequent stage's of the printhead manufacturing process according to the invention.
Figure 9:
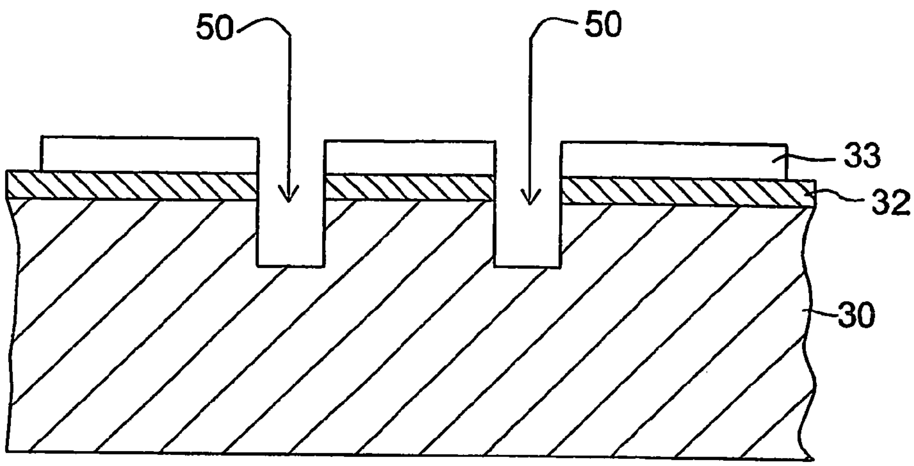
Figure 10:
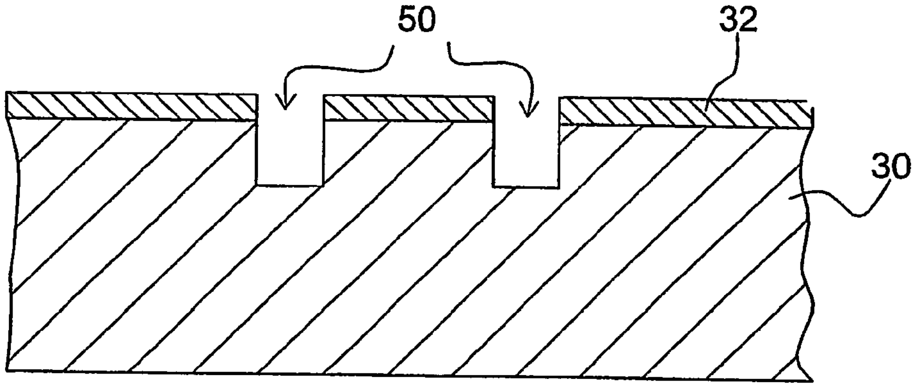
Figure 11:
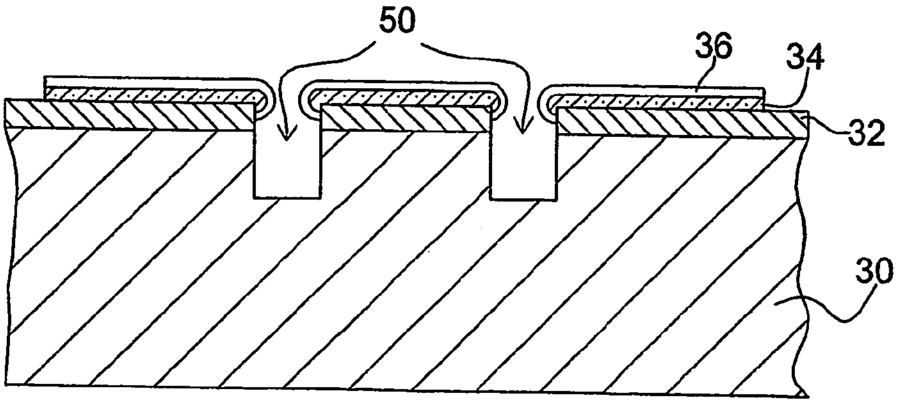
Figure 12:
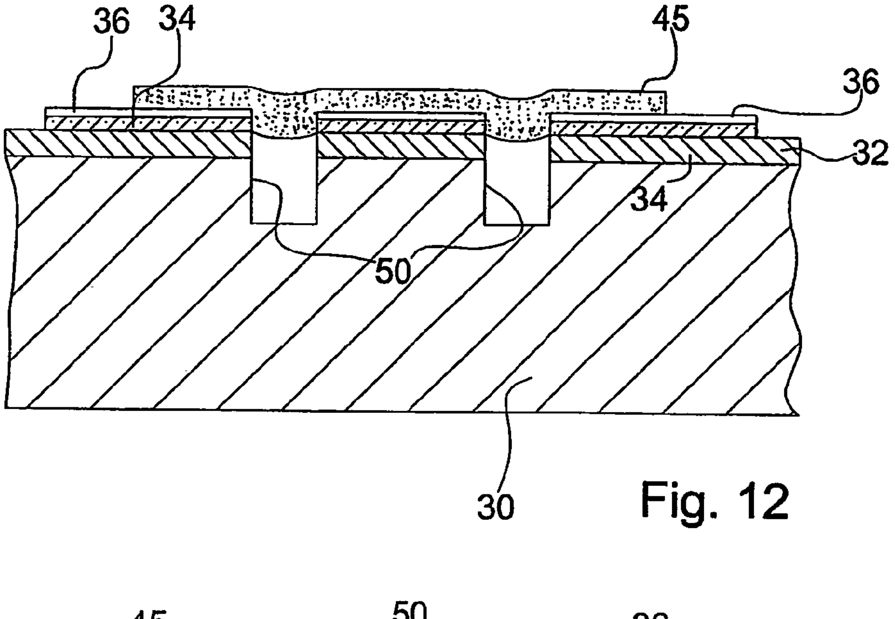
Figure 13:
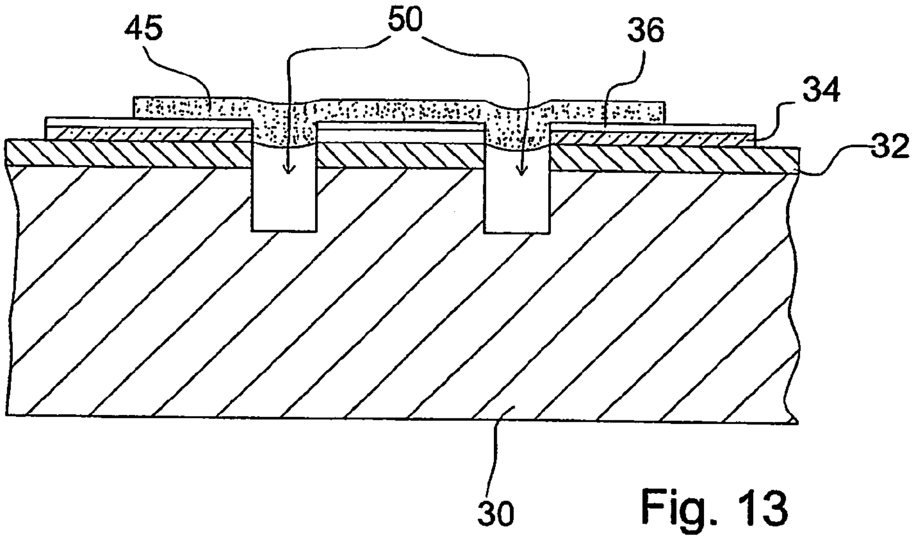
Figure 14:
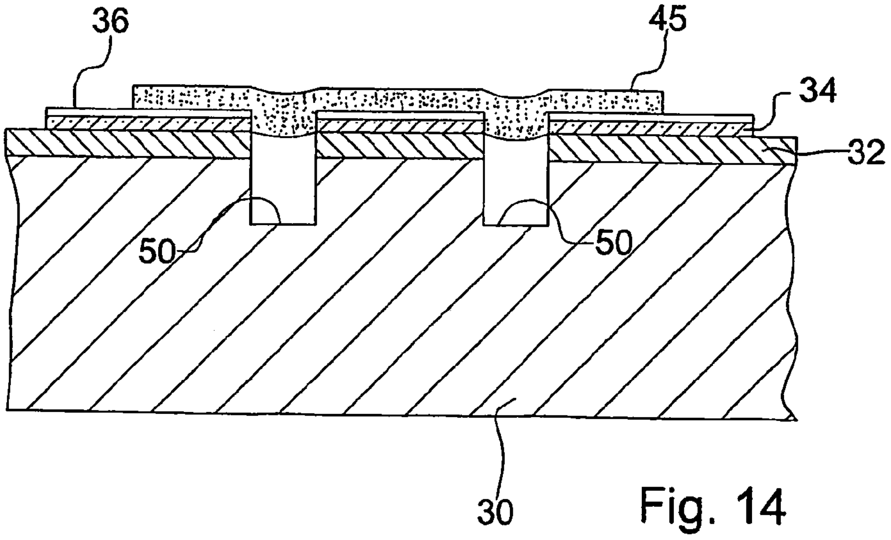
Figure 15:
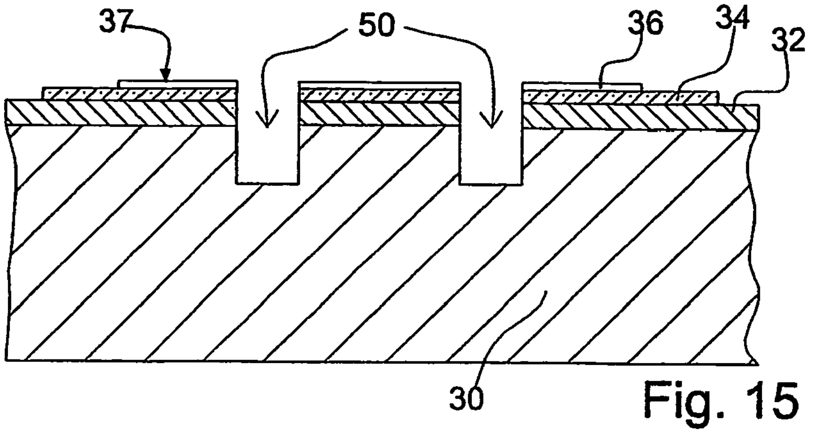

In the starting step 100, the wafer 27 (FIG. 3) is prepared, in which the die 20 are ready for the subsequent operations of production of the chambers and relative feeding ducts, according to this invention;

- in step 101, a double dielectric layer 32 is deposited, consisting of a first layer of silicon nitride ($Si_3N_4$), on top of which a layer of silicon carbide (SiC) is subsequently laid, having an overall thickness preferably between 0.4 and 0.6 μm; the layer 32 has the function of protecting the resistors 39 (FIG. 18), but not visible in FIG. 5 as they are outside the plane of section;
- in step 102, a layer of photoresist 33 (FIG. 8) is deposited and its lithographic etching executed with a suitable mask 35, in the position in which the feeding holes 50 will subsequently be etched;
- in step 103, illustrated with the aid of FIG. 9, the feeding holes 50 are etched, by means of a "dry" etching of the layer 32 of silicon nitride and carbide and of the sublayer of silicon 30, through a depth in the silicon preferably between 15 and 20 μm, and with a diameter of approx. 15 μm;
- in step 104 (FIG. 10), the residue of the layer of photoresist 33 is removed;
- in step 105, illustrated with the aid of FIG. 11, in a sputtering process, a layer 34 of tantalum having a thickness preferably between 0.4 and 0.6 μm is deposited on the layer 32 of silicon nitride and carbide. This is covered in turn with a layer 36 of gold, having thickness preferably between 100 and 200 A°; following this operation, the metals of the two layers 34 and 36 partly cover the edge of the holes 50, as can be seen in FIG. 11;
- in step 106, illustrated with the aid of FIG. 12, a positive photoresist 45 is laid, exposed and developed in order to define the geometry of the layers of gold 36 and of tantalum 34;
- in step 107, the layers of gold 36 and of tantalum 34 are etched (FIG. 13);
- in step 108, the positive photoresist 45 (FIG. 14) is exposed and developed a second time, in order to define the geometry of the layer 36 of gold;
- in step 109, the layer of gold 36 is etched to produce the so-called "seed layer" 37 (FIGS. 4 and 15), the dimensions of which are established in advance to define the desired shape and size of the bottom wall of the ejection chambers 42 and of the relative feeding ducts 56 (FIG. 4);
- in step 110, the remaining part of the photoresist is removed;
- in step 111, the surface of gold 36 is cleaned by means of a plasma etching in an oxygen atmosphere in order to eliminate any organic residues. At the same time, the surface of the layer 36 of gold is chemically activated in order to promote start of the electrodeposition of copper, described in the next step;
- in step 112, described with the aid of FIG. 16, a sacrificial layer 57 is deposited, starting from the layer 36 of gold, by means of the electrodeposition of electrolytic copper, used to produce the chambers and feeding ducts connected to them, according to this invention. Electrodeposition of the copper is obtained using a galvanic bath, the chemical composition and relative additives of which allow the percentage of growth to be controlled on the horizontal (x axis) with respect to that on the vertical (z axis). Thanks to this technique, the sacrificial layer 57 is deposited with a liberal growth, on the horizontal, i.e. without the use of a thick containing resist; with this process, the upper outer surface 58 of the sacrificial layer is grown with a convex shape, typically that of a varyingly accentuated dome; chemical activation of the surface 36 of gold, mentioned in the previous step, permits the start of a liberal and uniform deposition of the copper starting from all the surface 36 of gold and also the continuation of growth of the copper on the layer of tantalum 34, exceeding the layer of gold 36. Said layers 34 and 36 will constitute the bottom of the ejection chambers; in practice, in this embodiment, considered non-limiting, the final dimension of the sacrificial layer 57 on the horizontal (x axis), corresponding to the prefixed dimension of the bottom wall of the chambers and of the ducts connected to them, is defined by a corresponding dimension on the vertical (z axis), equal to the inner height of the chambers 42, in accordance with the predefined growth ratio of the copper.

As an alternative to the copper, nickel may also be employed to produce the sacrificial layer.

Figure 17:
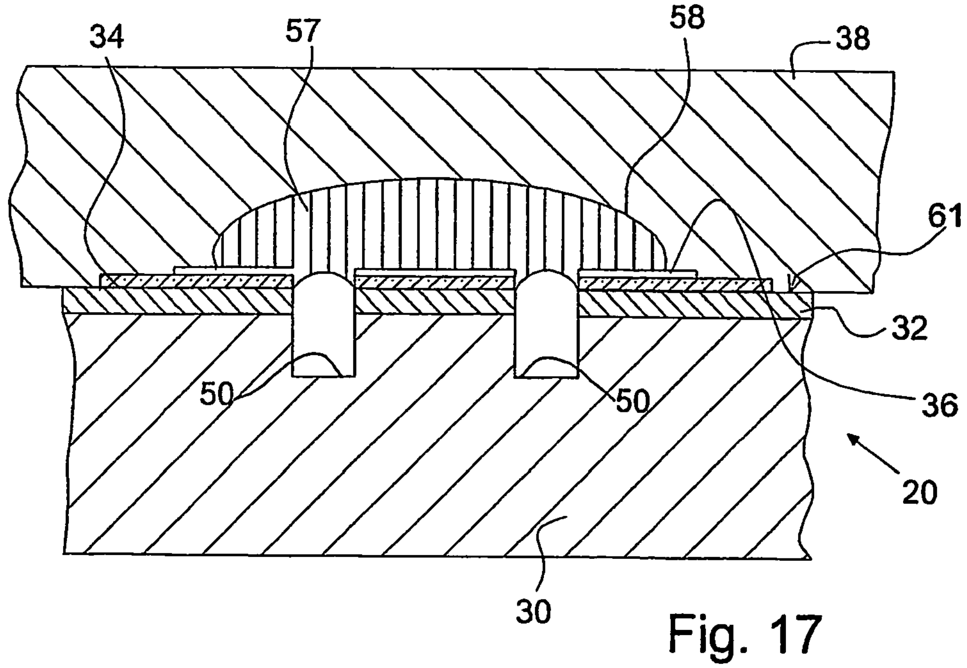
Figure 18:
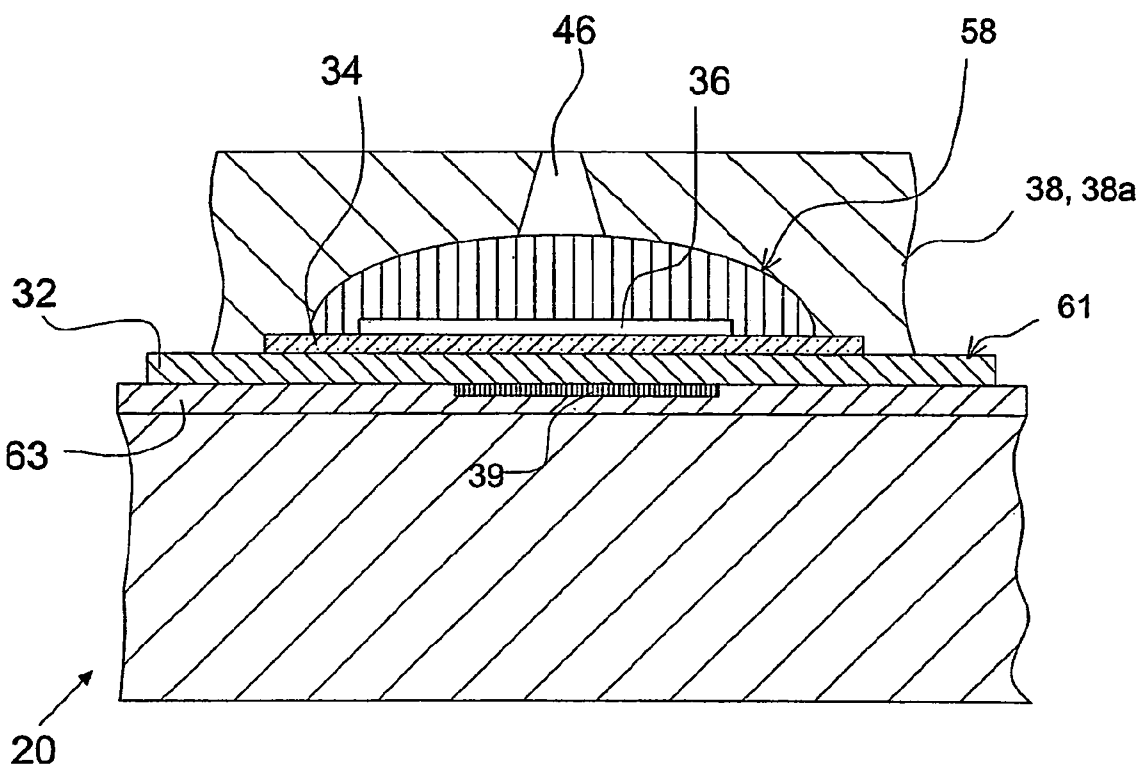
Figure 19:
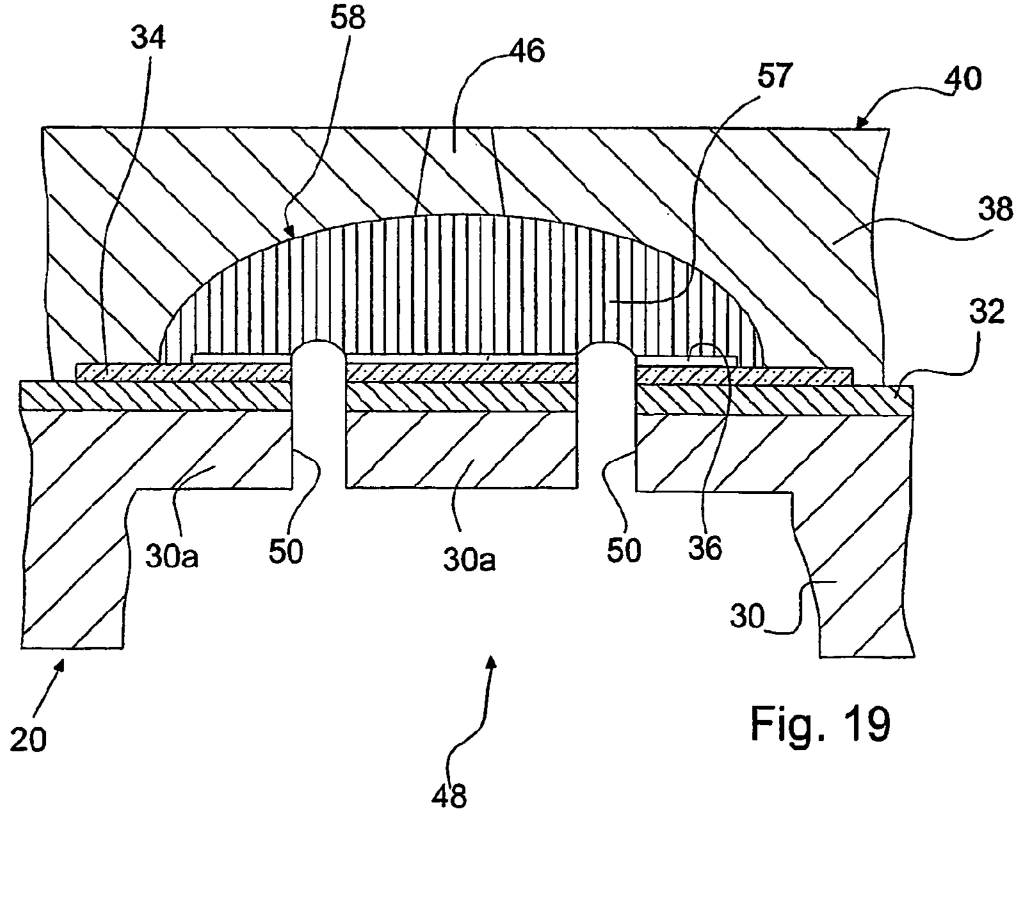

- in step 113, illustrated with the aid of FIG. 17, a photosensitive structural layer 38 is laid that covers the surface 61 of the die 20 and the external surface 58 of the sacrificial layer 57; the photosensitive layer 38 has a thickness preferably between 10 and 60 μm and is made of a negative, epoxy or polyamide type photoresist;
- in step 114, a prebake treatment is applied to the structural layer 38, at low temperature, preferably not above 90° C.;
- in step 115, illustrated with the aid of FIG. 18, the nozzles 46 are made through the structural layer 38, by means of exposure and development. It is pointed out that FIG. 17 represents a section of the die 20 along the line XVIII-XVIII of FIG. 4, and depicts a layer 63, between the silicon layer 30 and the protective layer 32; the layer 63 represents concisely the set of films constituting the microelectronics behind driving of the ejection of droplets of ink through the nozzle 46, obtained by means of resistors 39 produced in the layer 63, with methods well known to those acquainted with the sector art in step 116, a postbaking is performed on the structural layer 38 at a temperature preferably between 150 and 250° C.;

in step 117, the anisotropic etching is performed of the slot 48 in the lower part of the silicon layer 30 (FIG. 19), by means of a "wet" type technology that uses, for instance, KOH, or TMHA Etching of the silicon is continued up to the aperture of the holes 50, so that the thickness of the remaining layer 30*a* of silicon, in correspondence with the slot 48, is approximately 10 μm;

in step 118, the sacrificial layer 57 is removed with a chemical etching, conducted by means of a highly acid bath, for example made of a mix of HCl and HNO3 in a solution. The special convex shape of the upper surface 58 of the sacrificial layer 57, obtained with the process according to this invention, without live corners and dead angles, allows all of the copper comprising the sacrificial layer 57 to be taken off completely (FIG. 7).

At the end of this operation, the chambers 42 and the channels 56 are obtained (FIG. 4), the inner shape of which constitutes the true impression of the sacrificial layer 57, in that the upper surface 44 of the chambers and of the ducts connected to them faithfully repeat the outer surface 58 of the sacrificial layer 57.

in step 119, the upper surface 40 of structural layer 38 is planarized (FIG. 4), by way of a mechanical lapping and simultaneous chemical treatment of CMP type (Chemical-Mechanical-Polishing), or other similar process;

in step 120, on the outer surface 40 of the structural layer 38 for protection of the resin, a metallic layer 41, made preferably of chromium, having a thickness of approx. 1000 A°, is deposited by vacuum evaporation, with the purpose of creating a hydro-repellent outer surface (anti-wetting) having scratch-proofing and corrosion-proofing properties for the outer surface of the structural layer 38 of resin.

The final operations are carried out in step 121, known to those acquainted with the sector art, such as:

dicing of the wafer 27 into the single die 20;

soldering of a flat cable, not shown in the diagrams, to the pads on each die 20, through the known TAB process;

mounting of the die with relative flat cable on the container-tank of the head;

filling of the tank with ink and final testing.

2nd Embodiment: Non-Photosensitive Structural Layer

Figure 20:
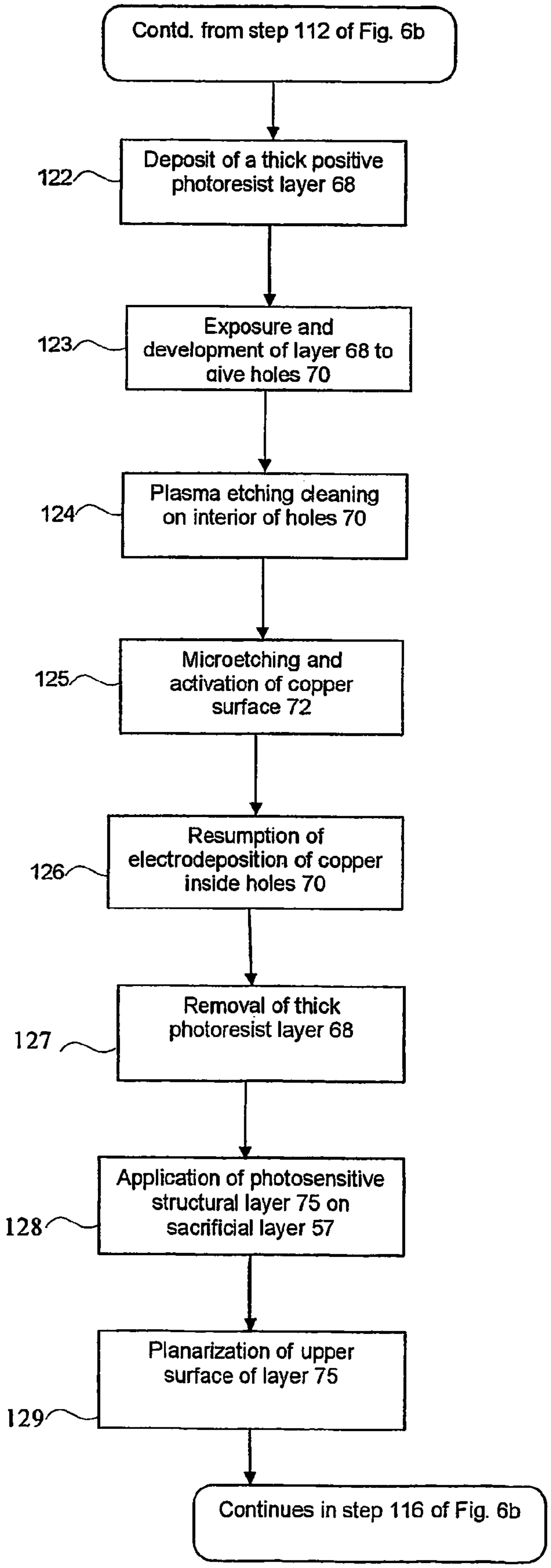
Figure 21:
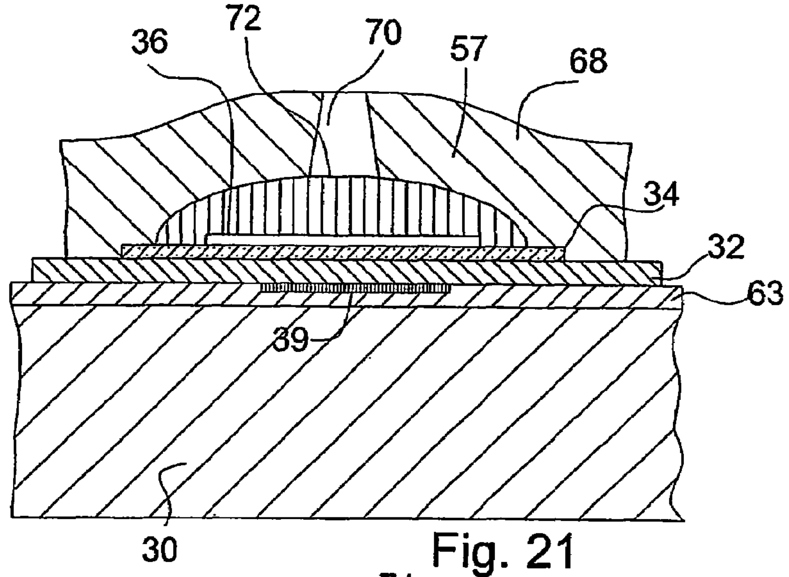

The following second embodiment will be described with reference to the flow diagram of FIG. 20 and to FIGS. 21-23.

Figure 6B:
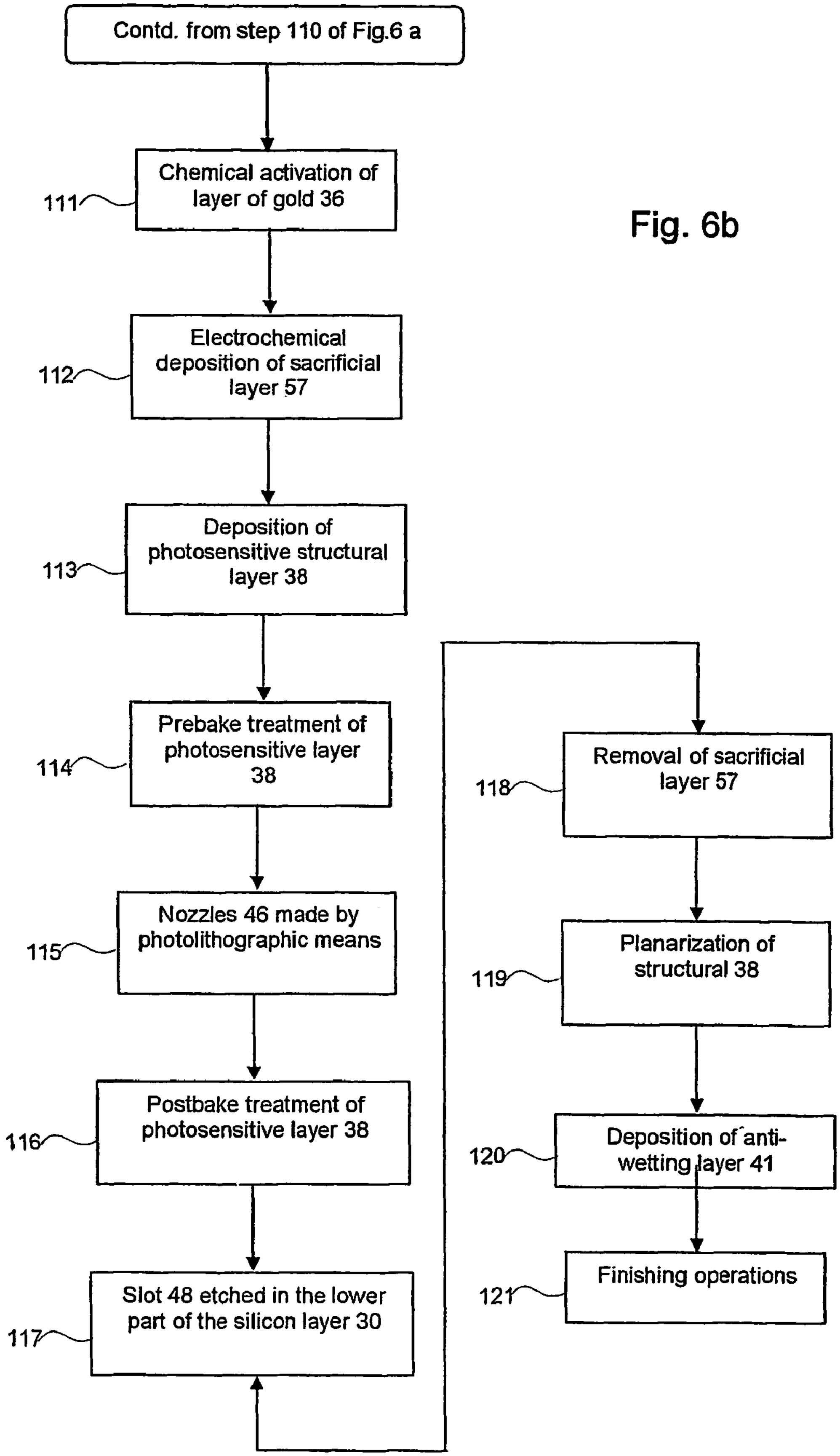
Figure 22:
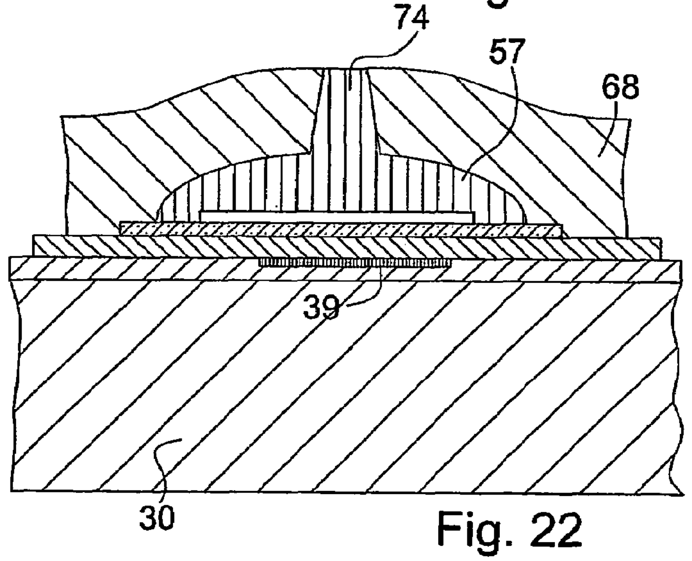
Figure 23:
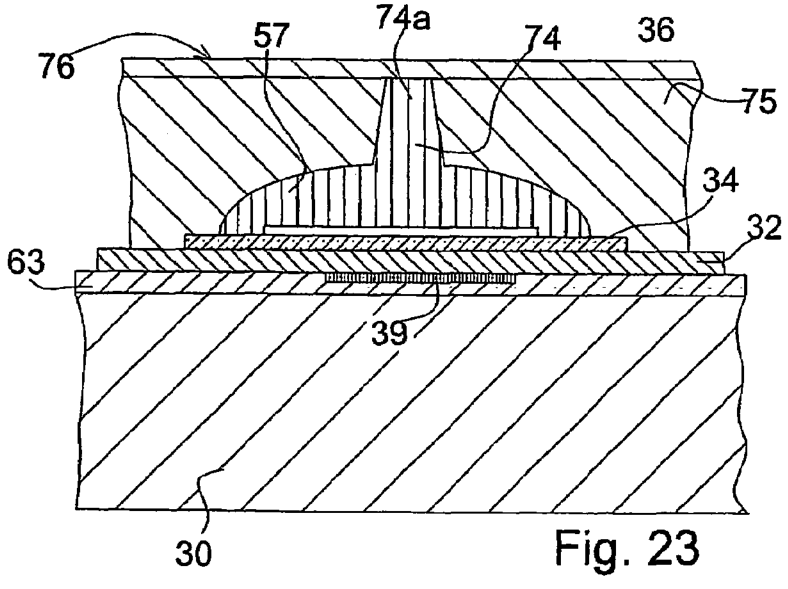

After carrying out the step 112 listed in the flow diagram of FIG. 6*b*, the process, according to this invention, continues with the operations described in the following steps:

in step 122 (FIG. 21), a layer 68 of thick, positive photoresist is deposited, in various passes, alternated with intermediate pauses to increase the compactness of the layer. As the positive photoresist, the commercial product known to those acquainted with the sector art as AZ4562 may be used, of thickness preferably between 25 and 60 μm;

in step 123, exposure and development of the positive photoresist 68 are performed to produce the holes 70, with inward flaring, used later to give a cast of the nozzles 46;

in step 124, a plasma etching type cleaning is performed to eliminate residues from development of the photoresist 68 inside the holes 70;

in step 125, a microetching is performed of a zone 72 (FIG. 21) of the sacrificial layer of copper left uncovered in correspondence with the hole 70, upon which copper will be grown with continuity to form a pillar 74 of metal, representing the cast of the nozzle 46, as will be described in the following steps;

in step 126, illustrated in FIG. 22, electrochemical growth of the copper is resumed inside hole 70, directly on the sacrificial layer 57, to build the pillar, or cast 74;

in step 127, the layer of thick, positive photoresist 68 is removed;

in step 128, illustrated in FIG. 23, a structural layer 75 of epoxy resin, or non-photosensitive polyamide resin, having thickness preferably between 25 and 60 μm, is laid so as to cover entirely the sacrificial layer 57, including the cast 74 of the nozzle 46. This type of resin is used to advantage to offer greater resistance to the aggressive environment created by inks, especially if very basic;

in step 129, planarization is performed on the upper surface. 76 of the structural layer 75, by means of mechanical lapping and simultaneous chemical treatment of the CMP type (Chemical-Mechanical-Polishing), or other similar process, to uncover the upper dome 74*a* of the cast 74 of copper.

The process continues with the anisotropic etching of the slot 48 and removal of the sacrificial layer 57, as already described in step 116 and in the following steps, listed in the flow diagram of FIG. 6*b*.

3rd Embodiment: Non-Photosensitive Structural Layer

The following third embodiment consists in replacing step 113 and step 115 with the following steps 130 and 131:

in step 130, a non-photosensitive structural layer 38*a* (FIG. 18) is laid to cover the surface 61 of the die 20 and the outer surface 58 of the sacrificial layer 57; the non-photosensitive layer 38*a* has a thickness preferably between 10 and 60 μm and is made of an epoxy, or polyamide type negative resin;

in step 114, the nozzles 46 (FIG. 18) are made through the non-photosensitive structural layer 38*a*, using the excimer laser technology. This type laser has the advantage of automatically stopping its action when it meets the upper surface of the sacrificial layer 57 of copper, so that there is no need to take any other measures to interrupt the aggressive action of the laser beam, required with lasers of other types. In particular, by suitably focusing the laser beam, it is possible to produce the nozzles 46 in a cylindrical shape, or with a truncated cone shape, with their greater base in contact with the surface of the sacrificial layer 57.

The manufacturing process continues with the anisotropic etching of the slot 48 and removal of the sacrificial layer 57, as already described in step 115 and in the following steps, listed in the flow diagram of FIG. 6*b*.

It remains understood that the manufacturing details and the embodiments may vary abundantly with respect to what has been described and illustrated, without departing from the scope of this invention.

The invention claimed is:

1. An ink jet printhead, for the emission of droplets of ink on a print medium, comprising:

a sublayer of silicon, a structural layer on top of said sublayer of silicon, and a plurality of chambers and corresponding feeding ducts, each chamber containing at least one resistor, said structural layer having a plurality of ejector nozzles communicating with each of said chambers and arranged facing each of said resistors, wherein each of said chambers defines a flat bottom wall and an opposed dome-shaped upper wall, the dome-shaped upper wall defining a perimeter continuously joined to said flat bottom wall, the bottom wall comprising a protective layer.

2. The ink jet printhead according to claim 1, wherein said protective layer is made of a first layer of tantalum, facing the inside of said chamber, and deposited on top of a second isolating layer of silicon carbide and nitride in contact with said resistors.

3. The ink jet printhead according to claim 2, wherein said first layer of tantalum extends substantially beyond the perimeter of the dome-shaped upper wall and constitutes said bottom wall.

4. The ink jet printhead, according to claim 1, wherein said dome-shaped upper wall is joined uninterruptedly to the corresponding feeding duct, said bottom wall and said nozzle.

5. The ink jet printhead according to claim 1, wherein each of said chambers and corresponding feeding ducts has an inner shape representing a complementary impression of a sacrificial layer obtained from a controlled and non-contained growth of a metal on a layer of gold ,the layer of gold being on top of said layer of tantalum.

6. The ink jet printhead according to claim 5, wherein said structural layer covers the sacrificial layer completely.

7. The ink jet printhead according to claim 1, wherein the inner shape of each of said chambers, said feeding ducts and said nozzles represents a complementary impression from a sacrificial layer within obtained from a controlled and non-contained growth of a metal on a layer of gold, the layer of gold being on top of a layer of tantalum.

8. The ink jet printhead according to claim 7, wherein said structural layer comprises a non-photosensitive epoxy or polyamide type, negative photoresist, applied on said sacrificial layer and completely covering said sacrificial layer.

9. The ink jet printhead according to claim 6, wherein said sacrificial layer and said layer of gold are removed by means of an acid bath, to create said chambers and said feeding ducts connected to them.

10. The ink jet printhead according to claim 5, wherein said sacrificial layer is made of electrolytic copper.

11. The ink jet printhead according to claim 5, wherein said sacrificial layer is made of nickel.

12. A manufacturing process for an ink jet printhead made on a wafer, divided into a plurality of die, each die comprising a sublayer of crystalline silicon, a plurality of thermal actuating elements arranged on said sublayer of crystalline silicon, and a protective layer including a layer of tantalum covered by a layer of gold, the process comprising:

a) chemically activating said layer of gold using a galvanic bath;

b) performing an electrodeposition of a metal on said layer of gold to make a sacrificial layer, obtained from a controlled and non-contained growth parallel and perpendicular to said layer of gold;

c) applying a photosensitive structural layer entirely covering said sacrificial layer;

d) photoetching a plurality of nozzles through said structural layer;

e) removing said sacrificial layer by chemical etching with an acid bath to produce a plurality of chambers and corresponding feeding ducts, wherein each of the chambers defines a flat bottom wall and an opposed dome-shaped upper wall, the dome-shaped upper wall defining a perimeter continuously joined to the flat bottom wall, the flat bottom wall including a tantalum layer and the layer of gold, and the upper wall representing a complementary impression of said sacrificial layer.

13. The process according to claim 12, wherein step a) is preceded by the following step: f) etching said layer of gold to define a starting area of said electrodeposition.

14. A manufacturing process of an ink jet printhead made on a wafer divided into a plurality of die, each die comprising a sublayer of crystalline silicon, a plurality of thermal actuating elements arranged on said sublayer of crystalline silicon, and a protective layer including a layer of tantalum covered by a layer of gold, the process comprising the following steps:

a) chemically activating said layer of gold using a galvanic bath;

b) performing an electrodeposition of a metal on said layer of gold to make a sacrificial layer, obtained from a controlled and non-contained growth parallel and perpendicular to said layer of gold;

c) applying a layer of positive photoresist on top of said sacrificial layer;

d) exposing and developing the positive photoresist to create holes with inward flaring;

e) removing photoresist residue inside said holes;

f) microetching and activating an oxidized portion of the surface of said sacrificial layer, in correspondence with said holes;

g) reactivating electrochemical growth of electrolytic copper directly on the sacrificial layer within the holes to create a cast for said nozzles;

h) removing said layer of positive photoresist;

i) applying a structural layer of non-photosensitive epoxy or polyamide resin over the sacrificial layer and the cast;

j) performing planarization of an upper surface of said non-photosensitive structural layer to uncover an upper dome of said cast of copper; and k) removing said sacrificial layer by chemical etching with an acid bath to produce a plurality of chambers and corresponding feeding ducts, each of the chambers being delimited internally by a flat bottom wall, and a concave upper surface joined uninterruptedly to the bottom wall, the bottom wall including a tantalum layer and the layer of gold and the upper surface representing a complementary impression of said sacrificial layer.

15. The process according to claim 14, wherein said non-photosensitive structural layer is produced with a thickness between 25 and 60 μm.

16. A manufacturing process of an ink jet printhead made on a wafer divided into a plurality of die, each die comprising a sublayer of crystalline silicon, a plurality of thermal actuating elements arranged on said sublayer of crystalline silicon, and a protective layer including a layer of tantalum covered by a layer of gold, the process comprising the following steps:

a) chemically activating said layer of gold using a galvanic bath;

b) performing an electrodeposition of a metal on said layer of gold to make a sacrificial layer, obtained from a controlled and non-contained growth parallel and perpendicular to said layer of gold;

c) applying a non-photosensitive structural layer covering the outer surface of said sacrificial layer; said non-photosensitive layer being made of a negative, epoxy or polyamide type resin:

d) making a plurality of nozzles through said structural layer, using an excimer laser; and e) removing said sacrificial layer by chemical etching with an acid bath to produce a plurality of chambers and corresponding feeding ducts, wherein each of the chambers defines a flat bottom wall and an opposed dome-shaped upper wall, the dome-shaped upper wall defining a perimeter continuously joined to the flat bottom wall, the bottom wall including a tantalum layer and the layer of gold and the upper surface representing a complementary impression of said sacrificial layer.

* * * * *

UNITED STATES PATENT AND TRADEMARK OFFICE

CERTIFICATE OF CORRECTION

PATENT NO. : 7,595,004 B2
APPLICATION NO. : 10/538743
DATED : September 29, 2009
INVENTOR(S) : Lucia Giovanola et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this
Fifteenth Day of February, 2011

David J. Kappos
*Director of the United States Patent and Trademark Office*